(12) United States Patent
Ferland et al.

(10) Patent No.: US 8,856,245 B2
(45) Date of Patent: Oct. 7, 2014

(54) SESSION-BASED SHORT MESSAGE SERVICE MANAGEMENT

(75) Inventors: Gilles Ferland, Kingston (CA); Daniel Biage, Gatineau (CA); Raymond A. Vilis, Ottawa (CA)

(73) Assignee: Solacom Technologies Inc., Gatineau (CA)

( * ) Notice: Subject to any disclaimer, the term of this patent is extended or adjusted under 35 U.S.C. 154(b) by 215 days.

(21) Appl. No.: 13/176,400

(22) Filed: Jul. 5, 2011

(65) Prior Publication Data

US 2012/0179763 A1    Jul. 12, 2012

Related U.S. Application Data

(60) Provisional application No. 61/361,160, filed on Jul. 2, 2010.

(51) Int. Cl.
| | |
|---|---|
| G06F 15/16 | (2006.01) |
| H04L 12/58 | (2006.01) |
| H04L 29/08 | (2006.01) |
| H04W 4/14 | (2009.01) |
| H04L 12/18 | (2006.01) |
| H04M 3/51 | (2006.01) |

(52) U.S. Cl.
CPC .............. *H04W 4/14* (2013.01); *H04L 51/14* (2013.01); *H04L 67/142* (2013.01); *H04L 67/146* (2013.01); *H04L 51/38* (2013.01); *H04L 12/1895* (2013.01); *H04L 12/5895* (2013.01); *H04L 12/5855* (2013.01); *H04L 67/141* (2013.01); *H04M 3/5116* (2013.01)
USPC .......................................................... 709/206

(58) Field of Classification Search
USPC .......................................................... 709/206
See application file for complete search history.

(56) References Cited

U.S. PATENT DOCUMENTS

| | | | |
|---|---|---|---|
| 8,401,154 B2 * | 3/2013 | Boni et al. ...................... 379/45 |
| 8,411,843 B1 * | 4/2013 | Cyriac et al. ............. 379/266.06 |
| 8,438,296 B2 * | 5/2013 | Wright et al. ................. 709/230 |
| 2006/0019702 A1 * | 1/2006 | Anttila et al. .............. 455/556.1 |
| 2007/0050510 A1 * | 3/2007 | Jiang ............................. 709/227 |
| 2007/0055732 A1 * | 3/2007 | Stevens ......................... 709/206 |
| 2008/0081646 A1 * | 4/2008 | Morin et al. .................. 455/466 |
| 2008/0132259 A1 * | 6/2008 | Vin ................................ 455/466 |
| 2010/0003946 A1 * | 1/2010 | Ray et al. ................... 455/404.1 |
| 2010/0003958 A1 * | 1/2010 | Ray et al. ................... 455/404.2 |
| 2010/0287226 A1 * | 11/2010 | Wright et al. ................. 709/202 |
| 2011/0258266 A1 * | 10/2011 | Serra et al. .................... 709/206 |

* cited by examiner

*Primary Examiner* — Alicia Baturay
(74) *Attorney, Agent, or Firm* — Gowling, Lafleur Henderson, LLP

(57) ABSTRACT

A short message service (SMS) message management system for special number service operator in a public safety answering point based environment is provided. SMS messages received at a gateway are converted to instant messaging session and routed to an operator position coupled to the gateway. The gateway maintains a messaging session between the operator position and the wireless device ensuring consistent communication is provided between the two parties.

18 Claims, 9 Drawing Sheets

SESSION-BASED SHORT MESSAGE SERVICE MANAGEMENT

CROSS-REFERENCE TO RELATED APPLICATIONS

This application claims priority from U.S. Patent Application No. 61/361,160 filed Jul. 2, 2010, the entirety of which is hereby incorporated by reference.

TECHNICAL FIELD

The present disclosure relates to short message service messaging system and in particular to enabling session-based short message service management in a special number service operator based environment.

BACKGROUND

Short message service (SMS) or text messaging communication is becoming increasingly prevalent means of communication particular from wireless mobile devices. SMS messages communication is typically peer to peer or mobile to mobile communications. Operator based systems such as special number services such as 9-1-1 have not been able to accept SMS messaging communications as a specific operator at Public Safety Answering Point (PSAP) is not associated with a single destination number. Accordingly, systems and methods that enable session based SMS communication with an operator remain highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

SUMMARY

Figure 1:
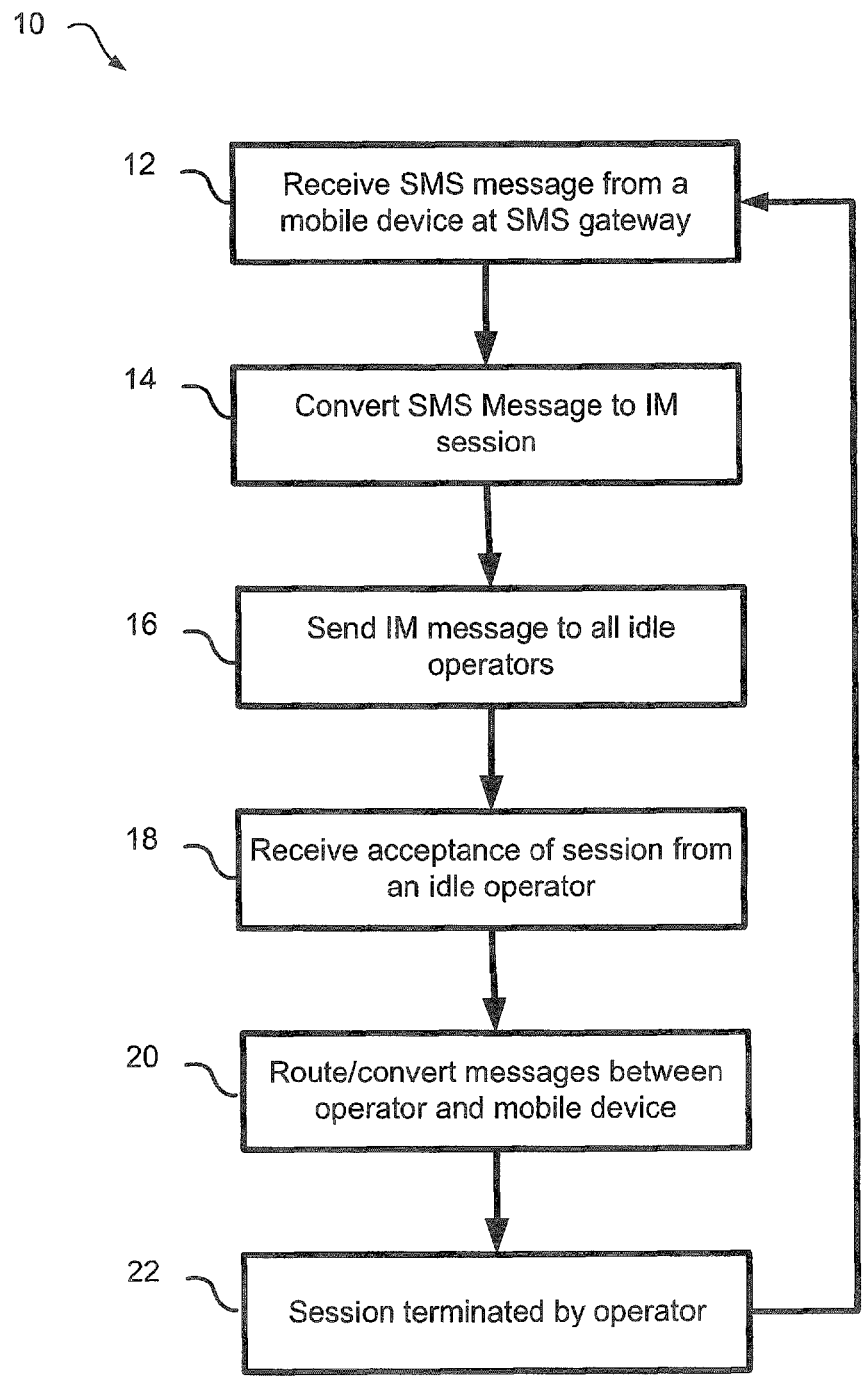
FIG. 1 shows a method of SMS session management distribution to idle operator positions.

In accordance with an aspect of the present disclosure there is provided a method of short message service session management for a special number service at a public safety answering point, the method comprising receiving at a gateway an SMS message from a mobile device through a wireless network, the SMS message directed from the mobile device to a number associated with the public safety answering point; converting SMS message to an instant message (IM); sending the IM message to an operator position coupled to the gateway through a network; receiving acceptance from the operator position to initiate the session; and sending subsequent SMS messages from the mobile device to the operator position maintaining the session based upon an originating identifier associated with the mobile device.

In accordance with another aspect there is provided a gateway server for providing session-based short message service (SMS) messaging management at a special number service at a public safety answering point comprising a processor and a memory providing instructions for execution by the processor, the instructions providing: SMS message receiver for receiving SMS message from a mobile device coupled to wireless network; SMS/Instant Message (IM) mapper for converting SMS message format to an IM format; and IM session manager for receiving converted SMS to IM message from the SMS/IM mapper and assigning the IM message to an operator position and maintaining an IM session by routing SMS messages between the mobile device and the operator until the session is terminated by the operator position.

In accordance with yet another aspect there is provided a computer readable memory containing instructions for providing short message service session management at a public safety answering point, the instructions which when executed by a processor perform the method comprising receiving at a gateway an SMS message from a mobile device through a wireless network, the SMS message directed from the mobile device to a number associated with the public safety answering point; converting SMS message to an instant message (IM); sending the IM message to an operator position coupled to the gateway through a network; receiving acceptance from the operator position to initiate the session; and sending subsequent SMS messages from the mobile device to the operator position maintaining the session based upon an originating identifier associated with the mobile device.

DETAILED DESCRIPTION

Embodiments are described below, by way of example only, with reference to FIGS. 1-9.

A session-based short message service (SMS) to instant message (IM) Gateway (SMS/IM gateway or gateway) operator based communication system and method are provided. The gateway interfaces to the mobile or cellular network using a wireless modem or a network working protocol to send and receive SMS messages. The gateway can provide or interface with an IM Server using an Extensible Messaging and Presence Protocol (XMPP) to manage communication sessions. The gateway receives an SMS from a mobile device, i.e. cellphone, with a designated number such as '9-1-1'. The gateway translates it to an IM and sends to an Operator (IM client) depending on presence and the mode of operation configured for the queue (a group of IM clients). When an operator replies to the first SMS coming for a specific Caller the gateway 1) receives the IM, 2) establishes a "pseudo-session", 3) translates the IM back to an SMS and 4) sends the SMS to the mobile client. The gateway will then translate and route any further messages (SMS to IM and vice versa) between the Caller and the Operator until the session is terminated. The Operator can terminate the "pseudo-session"

using a special code. The "pseudo-session" will also expire after a predetermined inactivity timeout.

The SMS/IM Gateway connects to the Cellular Network using off-the-shelf cellular modems selected to interwork with the Customer cellular network. Initial interface can be GSM/GPRS, however any wireless technology such as CDMA, EVDO, 3GPP, HSPDA, LTE or any wireless technology support SMS or multimedia message service (MMS). For simplicity the description refers to SMS messages although it should be understood that the disclosure is equally applicable to MMS messages. Other interfaces can be added as required. The Gateway supports multiple interfaces in order to connect to separate Cellular networks and/or provide redundancy. A number of cellular modems may be utilized for receiving SMS messaging from the same special number service. A round-robin configuration may be utilized depending on traffic volumes to address SMS messages to the next available cellular modem. This function would be performed within the service provider network. Alternatively the SMS/IM gateway may receive the SMS message via a Short Message Peer-to-Peer (SMPP) protocol message provided through a network coupled to the wireless network, therefore not requiring a modem connection to the SMS/IM gateway. The SMPP protocol would route the SMS message to a network address associated with the SMS/IM gateway.

The gateway tries to re-establish a connection to the IM server at a regular interval, configurable, if it detects a failure. The gateway uses a configuration file to read the following parameters:

IM (XMPP) screen name
IM (XMPP) domain name
Queue member list (Agent status will be determined dynamically using presence information)
Inactivity timeout to terminate sessions
Retry interval when IM connection failure is detected
Queuing mode
Automated reply text message It is assumed that the network keeps messages until they are read by the Gateway, therefore messages will not be lost while the Gateway restarts.

When the SMS/IM Gateway process starts performs the following:

Query the wireless modem or network interface
Initialize the modem for proper operation
Connect to IM Server
Send a Start-up Messages to all Operators
When the SMS/IM Gateway receives an SMS:

If no active session, the SMS message is assigned to an operator depending on queuing mode and creates a new session and starts an inactivity timer. If there is an active session for the Caller based upon originating number associated with the SMS message, the gateway retrieves current Operator associated with session. The gateway sends an automated reply to mobile phone indicating that SMS has been received and sent to an operator. The gateway then translates message to IM and sends to an IM client of the current Operator for that session.

The operator normally needs a session to be established before sending messages to the gateway. However a special mode of operation allows the operator to override and send messages to any mobile by using the following prefix: +1<10-digit phone number of mobile>.

When the SMS/IM gateway receives an IM from an operator: The SMS/IM Gateway supports sending the SMS message to the first to respond, a most idle operator or based upon a priority indicator to determine which operator should receive the SMS message.

FIG. 1 shows a method 10 of SMS session management distribution to idle operator positions. For the Send to All or first to respond mode, when the SMS/IM Gateway receives an SMS from a mobile that doesn't have an active session, the Gateway sends the IM to all available Operators. The Gateway will establish the "pseudo-session" with the first Operator that responds. The gateway receives SMS message from a mobile device (12) associated with the special number service. The SMS message is converted to an IM session (14). The session may be managed internally in the gateway or provided to an Extensible Messaging and Presence Protocol (XMPP) server. The IM message is sent to all idle operators (16). The first operator to accept the session, provide acceptances of the session to the gateway (18) and is assigned all communication from the mobile device until the session is terminated. During the session, messages between the SMS and IM gateway are routed and converted to the appropriate formats (20) based upon the phone number associated with the wireless device and maintained as a complete session in the operator client. When communication session is complete the operator terminates the session (22). When a future communication arrives from the same mobile device the process continues with the subsequent session being assigned to possibly a different operator.

Figure 2:
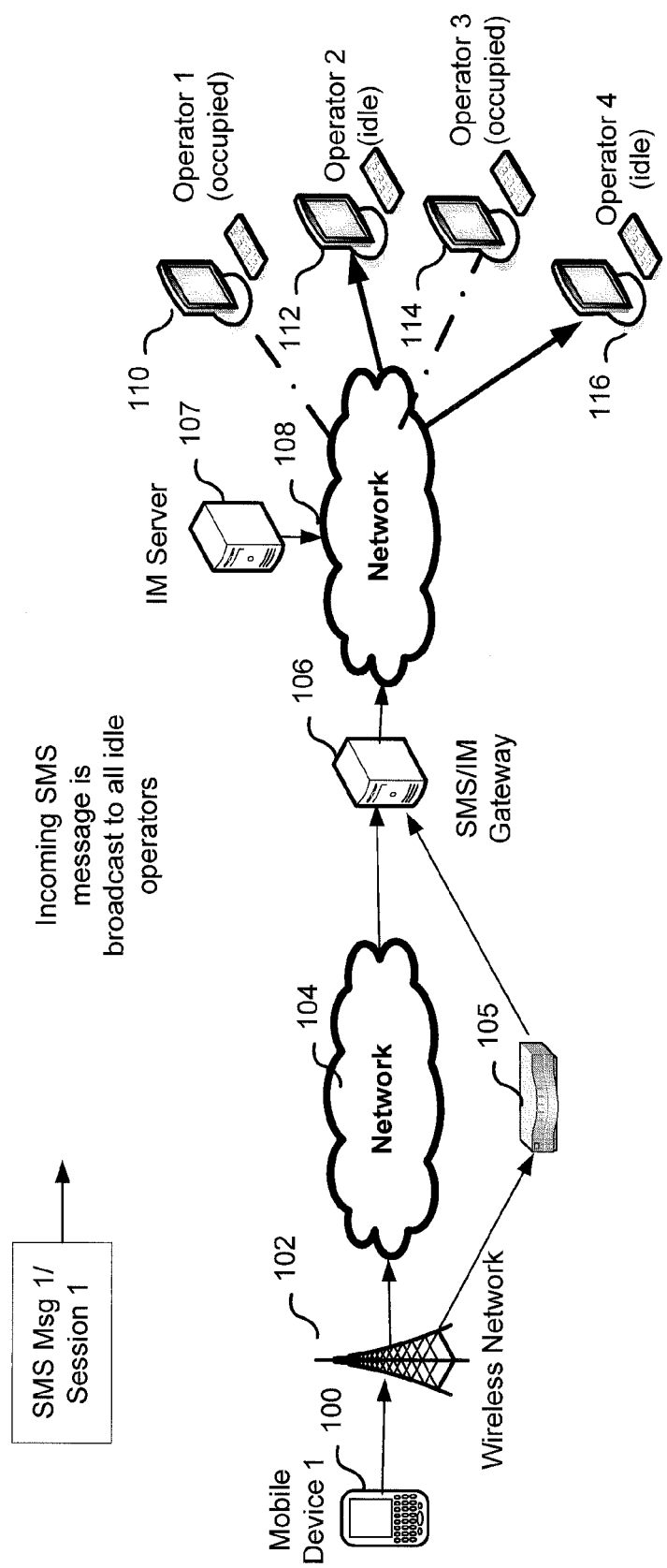
FIG. 2 shows a representation of SMS session management to broadcast an incoming SMS message from a mobile device to idle operator positions.

FIG. 2 shows a representation of SMS session management to broadcast an incoming SMS message from a mobile device to idle operator positions. The mobile device 100 sends a SMS message to a define number (for example one associated with a 911 service) through a wireless network 102. The wireless network 102 can be coupled to a network 104 where the SMS message is exchanged with the gateway 106 by Short Message Peer-to-Peer (SMPP) protocol using request/response protocol data units (PDUs). Alternatively the gateway may be coupled to the wireless network via one or more wireless modems 105 with the SMS message delivered to one or more wireless modems and provided to the gateway. The SMS/IM gateway is coupled to a network 108 hosting operator positions 110 to 116. An IM server 107 is coupled to the network 108 for managing the IM session within the network, or the functionality of the IM server 107 may be integrated into the gateway 106. In this example the SMS message is converted into an IM message and routed to an IM session operating on each of the operator positions 110 to 116 that are idle and can accept a possible session in an SMS client or application integrating SMS client functionality. The message is routed based upon the phone number associated with the SMS message or additionally based upon a location or position identifier provided or associated with the SMS message.

Figure 3:
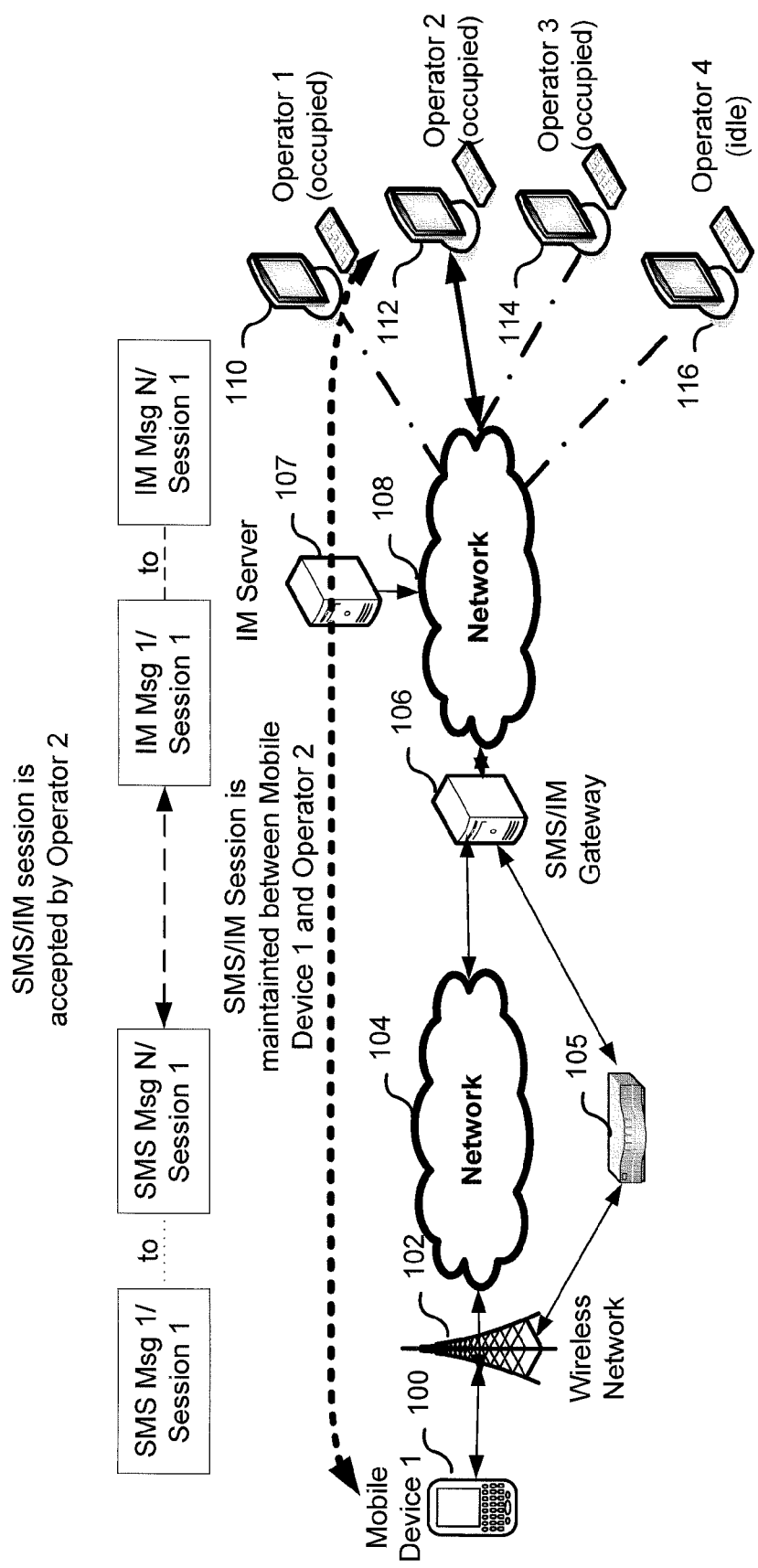
FIG. 3 shows a representation of SMS session management when a first idle operator accepts a session.

FIG. 3 shows a representation of SMS session management when a first idle operator accepts a session. Operator 112 accepts the session and starts an IM session through the server 107. The SMS/IM gateway converts IM messages from the IM server 107 to SMS and transmits the message through the wireless network and converts the SMS messages from the wireless network to IM message format. The IM server maintains the session between the device 100 and the operator 112 until the operator terminates the session. During the session any messages addressed from the mobile device will be routed directly to the server. This of particular advantage as the mobile device user can address the SMS message to a single number and not be required to directly send the number to a particular operator (which would not be know in advance).

Figure 4:
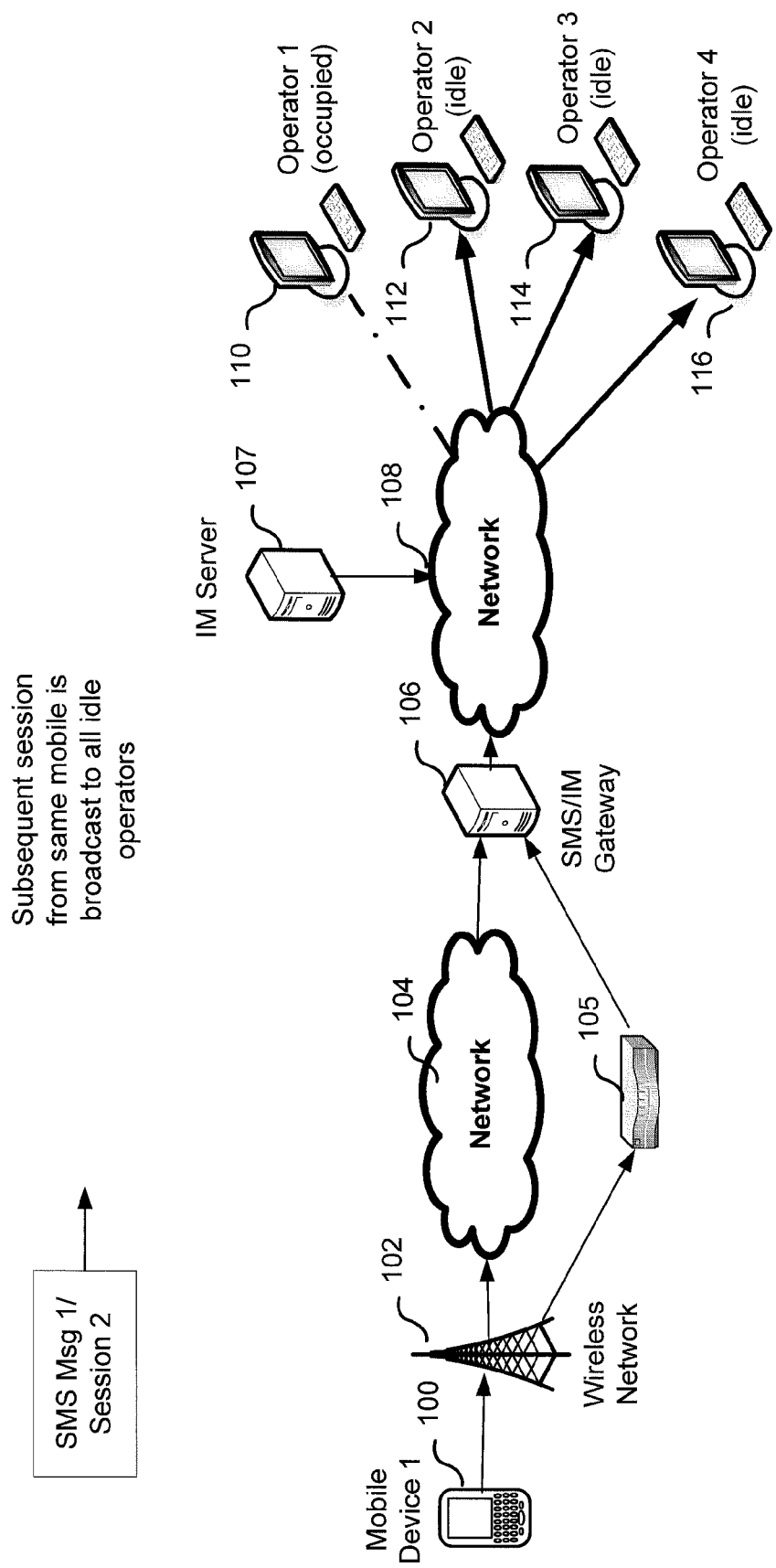
FIG. 4 shows a representation of SMS session management to broadcast an incoming SMS message from the same mobile device to idle operator positions.

FIG. 4 shows a representation of SMS session management to broadcast an incoming SMS message from the same mobile device to an idle operator position 112-116. As noted in connection with FIG. 3, a subsequent session from the same mobile device is again broadcast to all the idle operators, regardless of the operator that previously accepted the session. The subsequent session is only broadcast when there is no active session with the mobile device within the system.

Figure 5:
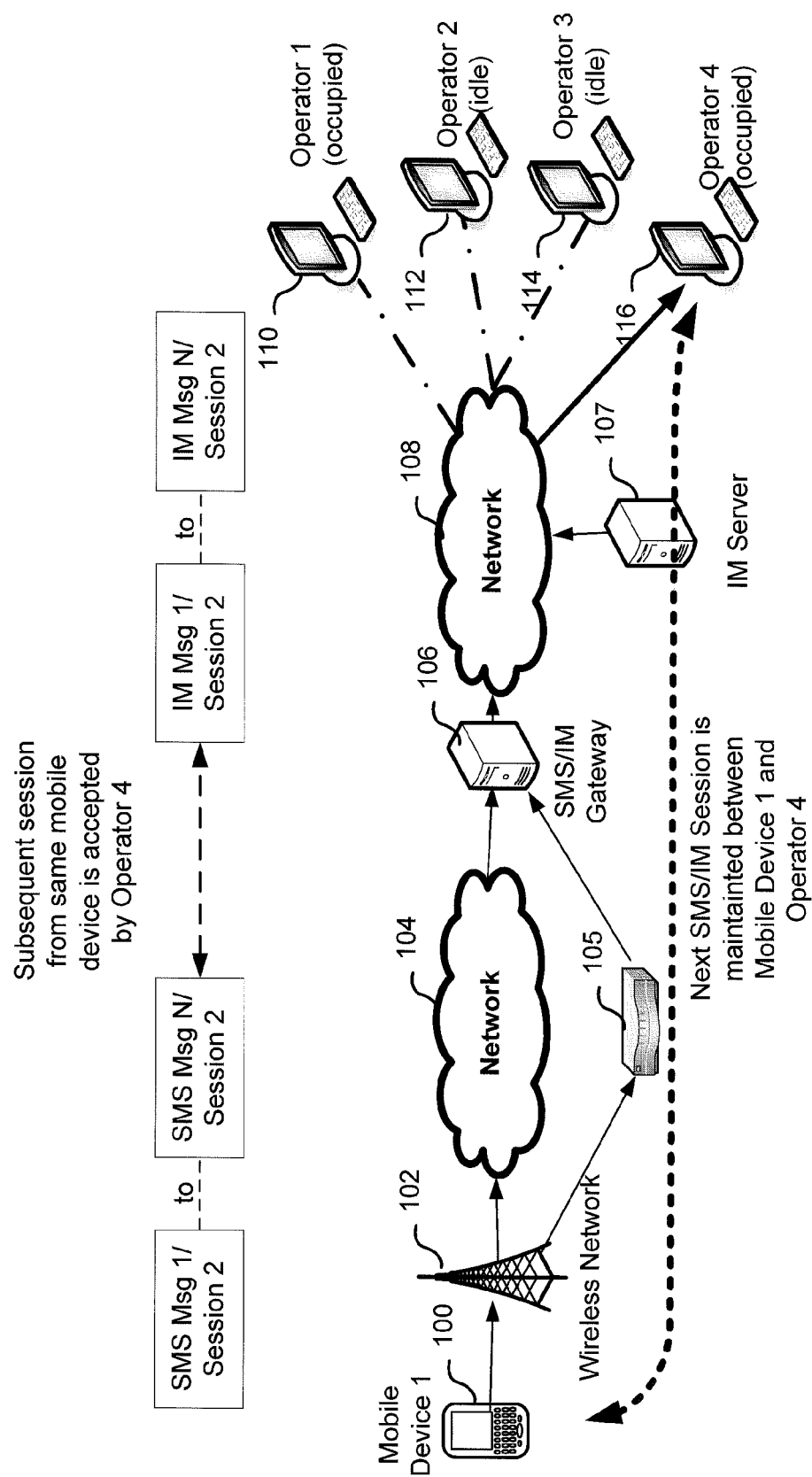
FIG. 5 shows a representation of SMS session management when an idle operator accepts a session from the same mobile device to a second idle operator position.

FIG. 5 shows a representation of SMS session management when an idle operator accepts a session from the same mobile device to a second idle operator position. As with FIG. 4, a new operator 116 can accept the session and maintain communication with the mobile device 100 until the session is terminated.

For the Priority mode, when the SMS/IM Gateway receives an SMS from a mobile that doesn't have an active session, the Gateway will select the available Operator with highest priority setting to establish the "pseudo-session".

For the Most Idle mode, when the SMS/IM gateway receives an SMS from a mobile that doesn't have an active session, the gateway selects an available Operator that has been idle for the longest period of time since its last session. Therefore the gateway tracks time of last session for each operator to determine which operator to route the next session to.

Figure 6:
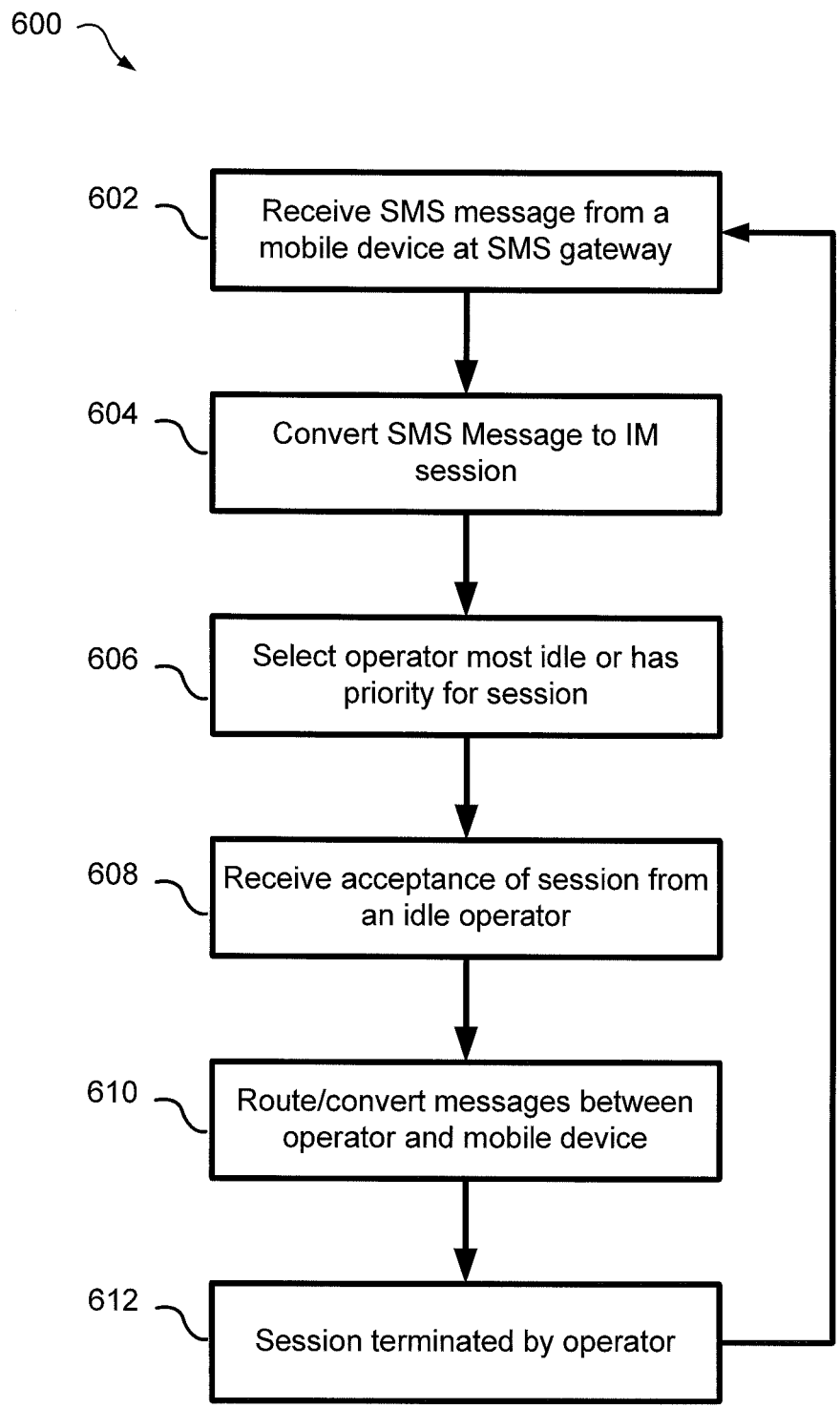
FIG. 6 shows a method of SMS session management distribution based upon an idle status or priority status of an operator.

FIG. 6 shows a method 600 of SMS session management distribution based upon an idle status or priority status of an operator. The gateway receives SMS message from a mobile device (602) either via an SMPP message or by interfacing with a wireless modem. The SMS message is converted to an IM session (604). The session may be managed internally in the gateway or provided to an XMPP server. The IM message is sent either an operator that is most idle or an operator that has been assigned priority to receive the session (606). The priority assignment may be based upon previous session history with the particular mobile device or other parameters based upon expertise or content within the message. The assigned operator accepts the message (608) and is assigned all communication from the mobile device until the session is terminated. During the session, messages between the SMS and IM gateway are routed and converted to the appropriate formats (610). When communication session is complete the operator terminates the session (612). When a future communication arrives from the same mobile device the process continues with the subsequent session being assigned to possibly a different operator.

Figure 7:
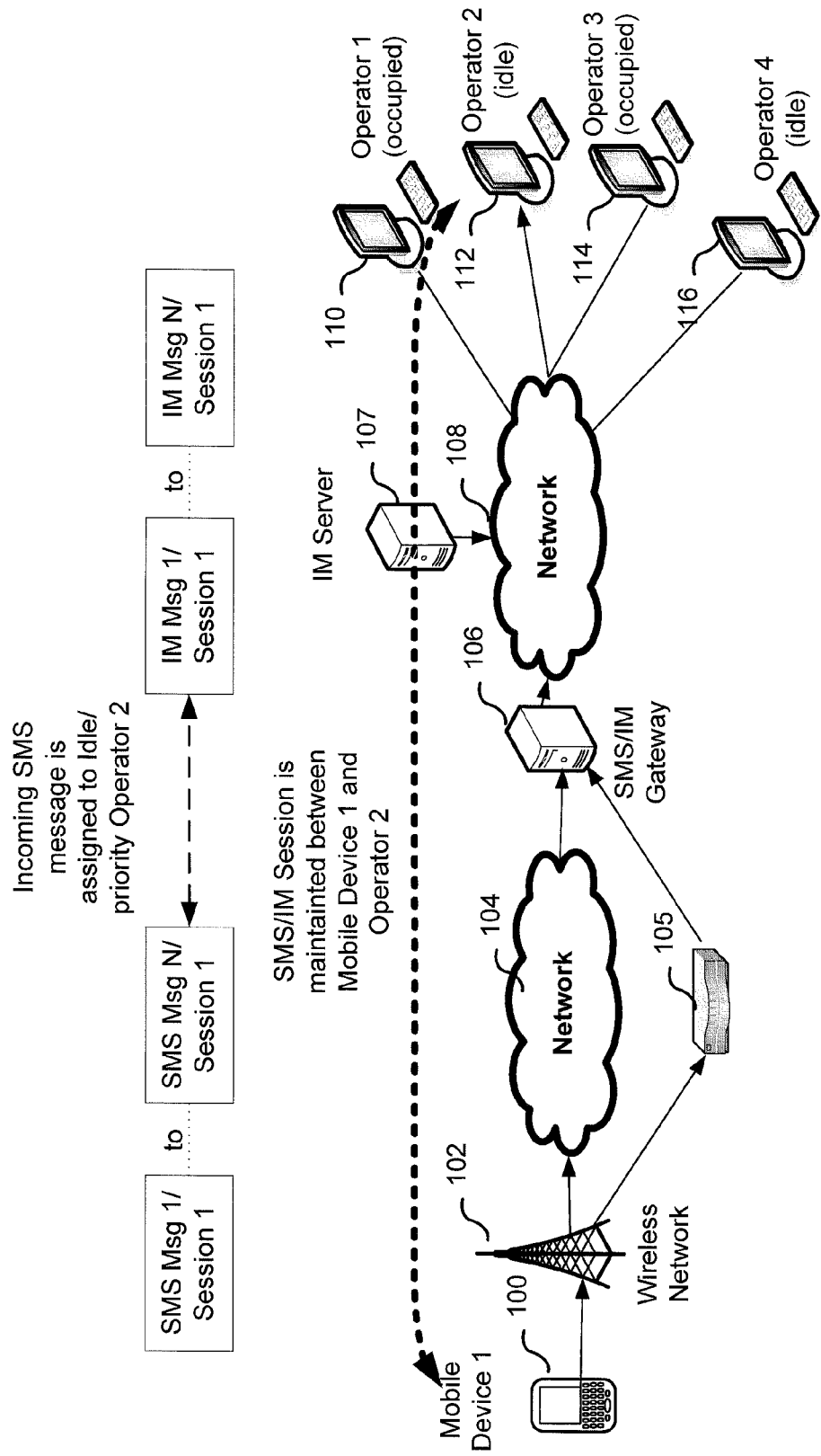
FIG. 7 shows a representation of SMS session management to assign an incoming SMS message from a mobile device to most idle or priority assigned operator position.

FIG. 7 shows a representation of SMS session management to assign an incoming SMS message from a mobile device to the idlest or priority assigned operator position. Operator 112 is assigned a session with the mobile device 100 and starts an IM session through the server 107. The SMS/IM gateway converts IM messages from the IM server 107 to SMS and transmits the message through the wireless network and converts the SMS messages from the wireless network to IM message format. The IM server maintains the session between the device 100 and the operator 112 until the operator terminates the session. During the session any messages addressed from the mobile device will be routed directly to the server.

Figure 8:
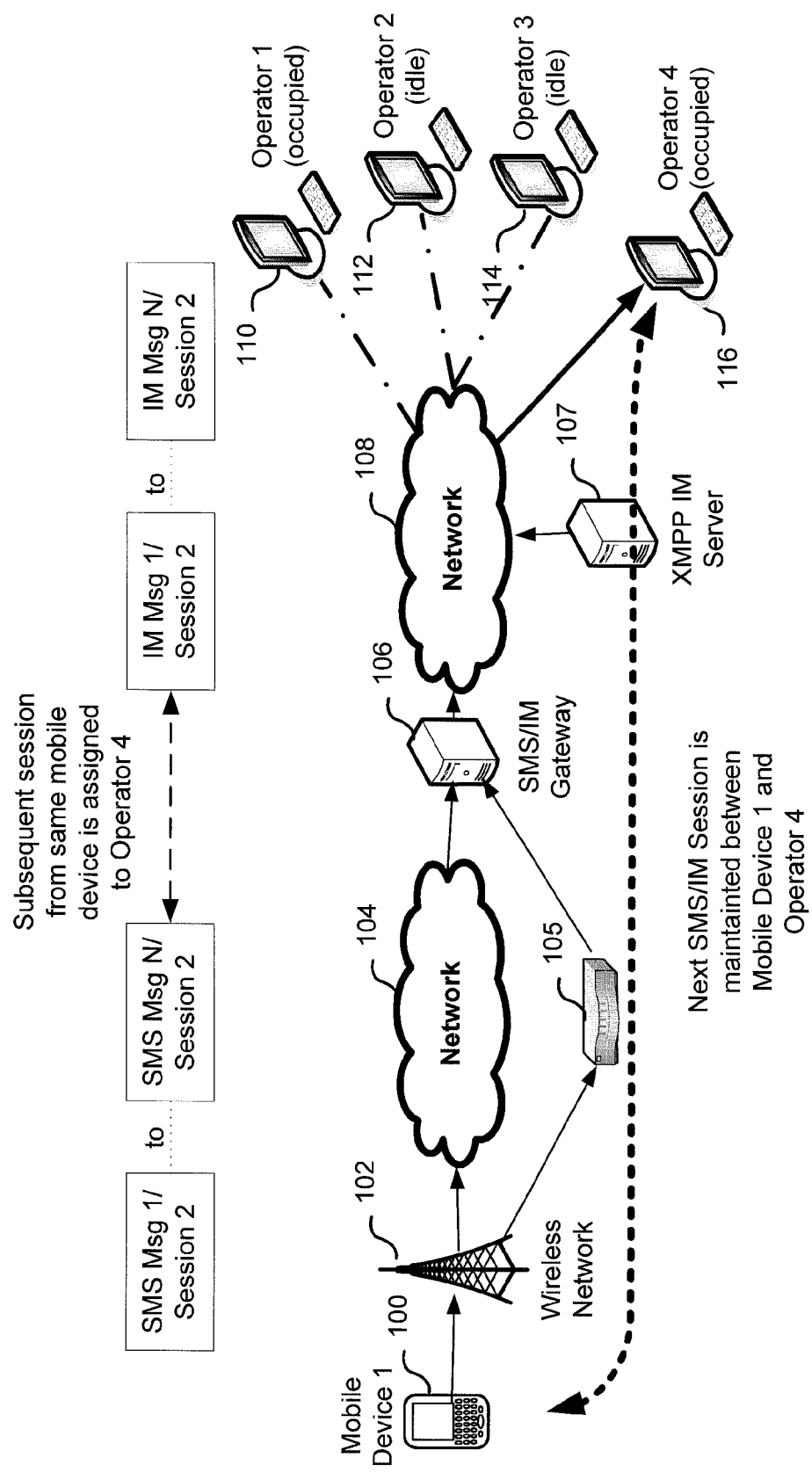
FIG. 8 shows a representation of SMS session management to assigned an incoming SMS message from the same mobile device in a subsequent session to most idle or priority assigned operator position.

FIG. 8 shows a representation of SMS session management to assign an incoming SMS message from the same mobile device in a subsequent session to most idle or priority assigned operator position. In this example a subsequent session from the same device 100 may be assigned to a new operator 116 based upon idle status or a priority characteristics.

Figure 9:
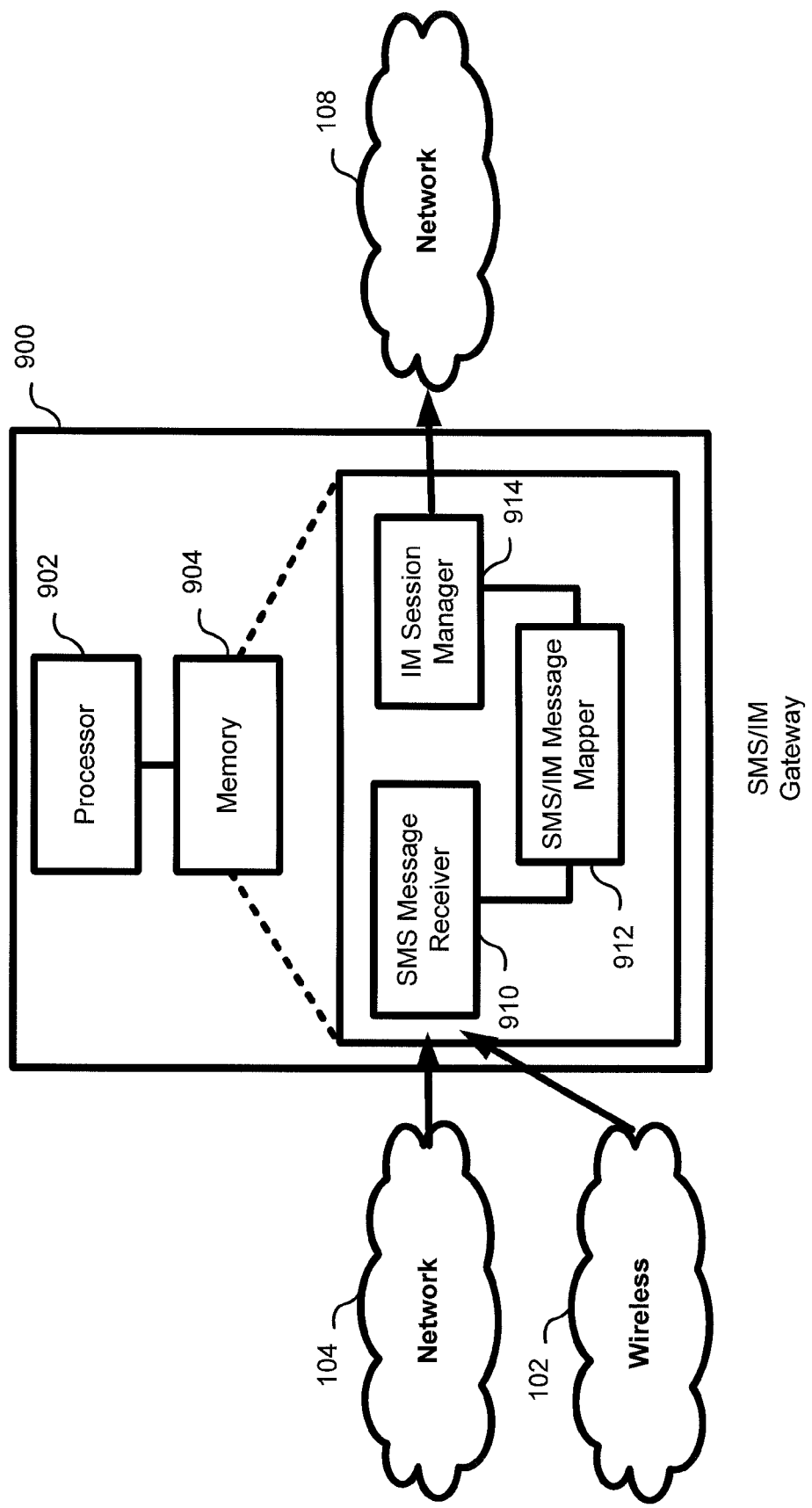
FIG. 9 shows representation of a SMS/IM gateway server.

FIG. 9 shows representation of a SMS/IM gateway server providing both SMS/IM conversion and IM session management. The SMS/IM gateway may comprise one or more processors 902 coupled to computer readable memory 904 for executing instructions for providing session-based SMS. The SMS message receiver 910 may be a wireless interface card or a network connection for receiving SMS or email formatted messages sent from SMS devices directly from the wireless network 102 or via a public network 104. The SMS/IM message mapper 912 converts the received SMS message to an instant message (IM) format utilized within the operator network. The IM session manager 914, may implement the XMPP functions to manage and establish a connection with one of the operators, dependent on the assignment method utilized in the network. Any messages received from or transmitted to the mobile device are routed by the IM session manager 914. Once the session is terminated by the operator the IM manager 914 may assign another session to the operator. Any subsequent session from the mobile device may be assigned to a different operator.

Depending on the configuration of the gateway or session manager an operator may be able to maintain multiple sessions concurrently by indicating to the session manager that they can accept additional sessions. The operator may also be able to designate that sessions pertaining to a particular location or event be concurrently routed to their client so that a single operator can manage information regarding a particular event at the same time. This may be provided by parsing of text by the gateway or session manger within the SMS message or utilizing location based services provided by the wireless network and provided through the network 104. The location based services would provide global positioning (GPS) co-ordinates of the wireless device enabling the session manager, or controller of the session manager, to allocate incoming SMS messages for a particular incident or region to specific operators. The GPS coordinates may be provided with the SMS message or provided by a query from the gateway to a service provide to retrieve position information. Alternatively operators may be able to redirect a session to another operator if an existing event handled by another operator is directly relevant to a situation or event being handled by the operator to ensure appropriate coordination of the event and services.

It will be apparent to one skilled in the art that numerous modifications and departures from the specific embodiments described herein may be made without departing from the spirit and scope of the present disclosure

The invention claimed is:

1. A method of short message service session management for a special number service at a public safety answering point (PSAP), the method comprising:

receiving at a gateway for the PSAP an SMS message from a mobile device through a wireless network, the SMS message directed from the mobile device to a number associated with the public safety answering point;

converting SMS message to an instant message (IM) wherein converting the SMS message to an IM message at the gateway;

determining an operator position from a plurality of operator positions by an XMPP service to send the IM message to a most idle operator position and/or an operator position that has a highest priority assigned to receive an SMS session;

sending the IM message to the determined operator position coupled to the gateway through a network of the PSAP;

receiving acceptance from the operator position to initiate the session; and sending subsequent SMS messages converted to IM messages from the mobile device to the determined operator position maintaining the session based upon an originating identifier associated with the mobile device.

2. The method of claim 1 further comprising:
receiving a termination request from the operator; and
terminating the session between the mobile device and the operator where subsequent SMS message from the mobile device may be assigned to another operator.

3. The method of claim 1 further comprising receiving the SMS message via Short Message Peer-to-Peer (SMPP) protocol data units (PDUs).

4. The method of claim 1 further comprising assigning the mobile device SMS message to an operator position using a location identifier provided with the SMS message.

5. The method of claim 1 further comprising assigning the mobile device SMS message to an operator position using a location identifier retrieved from a service provider associated with the wireless network.

6. The method of claim 1 further comprising receiving the SMS message via a wireless modem coupled to the gateway.

7. The method of claim 1 further comprising sending SMS messages from operator position to the mobile device during the session.

8. The method of claim 1 further comprising:
sending SMS message to the mobile device confirming that the message has been received and that the session with an operator will commence.

9. The method of claim 1 further comprising assigning the SMS session to an operator position based upon one or more keywords identified in the SMS message.

10. A gateway server for providing session-based short message service (SMS) messaging management at a special number service at a public safety answering point comprising:
a processor;
a memory providing instructions for execution by the processor, the instructions providing:
SMS message receiver for receiving SMS message from a mobile device coupled to a wireless network;
SMS/Instant Message (IM) mapper for converting SMS message format to an IM format; and
IM session manager for receiving converted SMS to IM messages from the SMS/IM mapper, and for determining an operator position from a plurality of operator positions by an Extensible Messaging and Presence Protocol (XMPP) service by a most idle operator position and/or an operator position that has a highest priority assigned to receive an SMS session, assigning the IM message to the determined operator position coupled to a network of the PSAP and maintaining an IM session by routing subsequent SMS messages between the mobile device and the determined operator until the session is terminated by the operator position.

11. The gateway server of claim 10 wherein the IM session manager receives a termination request from the operator, and terminates the session between the mobile device and the operator where subsequent SMS message from the mobile device may be assigned to another operator.

12. The gateway server of claim 10 wherein the SMS message receiver received the SMS message via Short Message Peer-to-Peer (SMPP) protocol data units (PDUs).

13. The gateway server of claim 10 wherein sending the IM session manager assigns the mobile device SMS message to an operator position using a location identifier provided with the SMS message.

14. The gateway server of claim 10 wherein sending the IM session manager assigns the mobile device SMS message to an operator position using a location identifier retrieved from a service provider associated with the wireless network.

15. The gateway server of claim 10 wherein the SMS message receiver receives the SMS message via a wireless modem coupled to the gateway.

16. The gateway server of claim 10 wherein the IM session manager sends an SMS message to the mobile device confirming that the message has been received and that the session with an operator will commence.

17. The gateway server of claim 10 the IM session manager assigns an SMS session to an operator position based upon one or more keywords identified in the SMS message.

18. A computer readable memory containing instructions for providing short message service session management at a public safety answering point (PSAP), the instructions which when executed by a processor perform the method comprising:
receiving at a gateway of the PSAP an SMS message from a mobile device through a wireless network, the SMS message directed from the mobile device to a number associated with the public safety answering point;
converting SMS message to an instant message (IM) wherein converting the SMS message to an IM message is performed at the gateway;
determining an operator position from a plurality of operator positions by the Extensible Messaging and Presence Protocol (XMPP) service that is a most idle operator position and/or an operator position that has a highest priority assigned to receive an SMS session;
sending the IM message to the determined operator position coupled to the gateway through a network of the PSAP;
receiving acceptance from the operator position to initiate the session; and
sending subsequent SMS messages from the mobile device to the determined operator position maintaining the session based upon an originating identifier associated with the mobile device.

* * * * *